(No Model.) 2 Sheets—Sheet 1.

M. FRIEDBERGER.
SELF TIMING ATTACHMENT FOR BICYCLES.

No. 499,221. Patented June 13, 1893.

(No Model.) 2 Sheets—Sheet 2.

M. FRIEDBERGER.
SELF TIMING ATTACHMENT FOR BICYCLES.

No. 499,221. Patented June 13, 1893.

Witnesses:

Inventor
Maurice Friedberger
By Joshua B. Webster
James Sheehy
Asso. Attorney

UNITED STATES PATENT OFFICE.

MAURICE FRIEDBERGER, OF STOCKTON, CALIFORNIA.

SELF-TIMING ATTACHMENT FOR BICYCLES.

SPECIFICATION forming part of Letters Patent No. 499,221, dated June 13, 1893.

Application filed January 10, 1893. Serial No. 457,902. (No model.)

*To all whom it may concern:*

Be it known that I, MAURICE FRIEDBERGER, a citizen of the United States, residing at Stockton, in the county of San Joaquin and State of California, have invented certain new and useful Improvements in Self-Timing Attachments for Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in bicyles and it consists of an attachment to the front standard whereby the time made, may be accurately noted, and in such other devices as will be described in the specification, and pointed out in the claims.

To more properly explain my invention reference is had to the accompanying drawings forming a part of the specification, in which—

Figure 1:
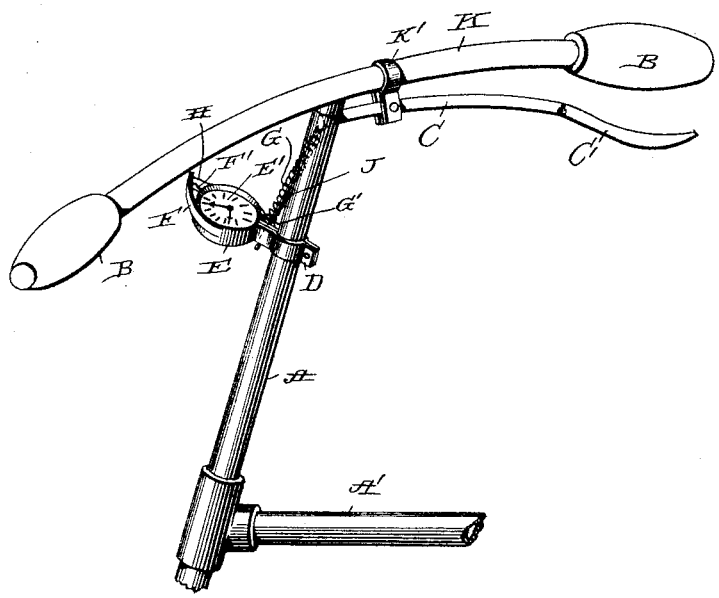
Figure 2:
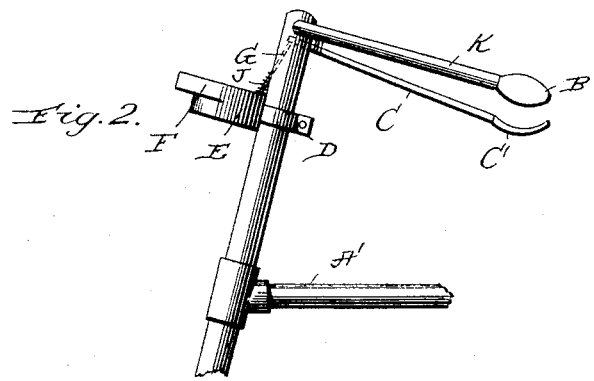
Figure 3:
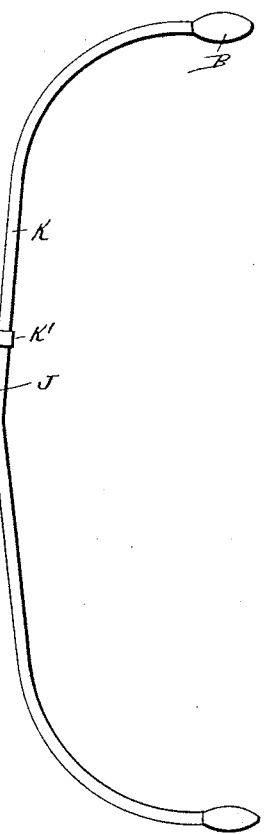
Figure 4:
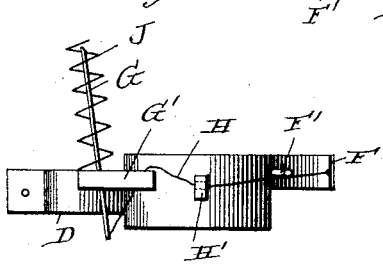

Figure 1 is a perspective view of the forward standard of a bicycle having my improvement attached thereto. Fig. 2 is a left hand side elevation of the same. Fig. 3 is a top view of the same. Fig. 4 is a detached right hand side elevation of a watch receptacle.

Similar letters of reference indicate corresponding parts.

A is the forward standard of a bicycle and A' is a coupling rod of the same.

B are the handles attached to a yoke K at the head of the standard A, by which the forward movement of the bicycle is controlled.

E is a dipper-like holder or receptacle which is attached at a suitable point on the standard A, by a clamp or clasp, D.

Attached to the side of the receptacle E, is a spring F, which comprehending the periphery of the receptacle E, passes over, and engages with, the stem F' of a stop watch E', which is inserted in the receptacle E. To the other end of the spring F, is attached a cord H, which passes through a guide in a lug H', attached to the receptacle E, thence through a guide in a plate G', which is attached to the side of the receptacle E and to the side of the clasp D. The cord H is attached to the lower end of a vertical rod G which passes through a hole in the plate G', the vertical rod G being also flexibly attached at its upper end to one end of a brake bar C.

Between the plate G' and the brake bar C, is a spiral spring J. K' is a clasp, by which is flexibly supported the brake bar C, its upper end being attached to the yoke K. The brake bar C, is provided with a handle C', which is parallel with and at a convenient distance beneath one of the handles B.

When the rider desires to note the time, he presses on the handle C', so that by the connecting mechanism above described, the hands of the stop watch E' are thrown into position. Then, when he has arrived at the point at which he desires to take the time, he presses again on the handle C', which movement starts the hands of the stop watch, and when he has arrived at any certain point he again presses on the handle C', which movement stops the hands of the watch and shows the time made.

The receptacle E, may be attached at any point on the standard A, by lengthening or shortening the cord H.

Having thus described my invention, what I claim as new is—

1. A self timing attachment for a bicycle consisting of the receptacle E, attached to the standard A by the adjustable clamp, D, the spring F attached to the receptacle E, and engaging with the stem F' of a stop watch E' within the receptacle E, the cord H attached to one end of the spring F, and passing through a guide in a lug H', attached to the receptacle E, the plate G', containing a guide for the cord H and attached to the receptacle E, and to the clamp D, the vertical rod G, passing through a hole in the plate G' and having the cord H attached at its lower end and comprehended by a spiral spring J, the brake bar C, provided with the handle C' and having the upper end of the rod G attached to it, the clasp K' attached to the steering yoke K B B and supporting the brake bar C, all operating substantially as described.

2. A watch holder adjustable on a bicycle standard and containing a stop watch, suitable connecting spring mechanism, a brake bar controlling such mechanism, whereby the rider may mark the time of the stop watch, all substantially as shown and described.

In testimony whereof I affix my signature in presence of two witnesses.

MAURICE FRIEDBERGER.

Witnesses:
JOSHUA B. WEBSTER,
JAMES T. SUMMERVILLE.